(12) United States Patent
Barry et al.

(10) Patent No.: US 10,305,895 B2
(45) Date of Patent: May 28, 2019

(54) MULTI-FACTOR AND MULTI-MODE BIOMETRIC PHYSICAL ACCESS CONTROL DEVICE

(71) Applicant: BLUB0X SECURITY, INC., Andover, MA (US)

(72) Inventors: Patrick J. Barry, Sands Point, NY (US); Patrick E. Barry, Port Jefferson, NY (US); Francis J. Cusack, Raleigh, NC (US); Niels Christian Haering, Reston, VA (US); Luciano Eloy Barrios, Williamsburg, MA (US)

(73) Assignee: BLUBOX SECURITY, INC., Andover, MA (US)

( * ) Notice: Subject to any disclaimer, the term of this patent is extended or adjusted under 35 U.S.C. 154(b) by 269 days.

(21) Appl. No.: 15/098,802

(22) Filed: Apr. 14, 2016

(65) Prior Publication Data

US 2016/0308859 A1   Oct. 20, 2016

Related U.S. Application Data

(60) Provisional application No. 62/147,021, filed on Apr. 14, 2015.

(51) Int. Cl.
*H04L 29/06* (2006.01)
*G06F 21/00* (2013.01)
(Continued)

(52) U.S. Cl.
CPC .......... *H04L 63/0861* (2013.01); *G06F 21/00* (2013.01); *G06K 9/00288* (2013.01);
(Continued)

(58) Field of Classification Search
CPC .............. H04L 63/0861; G06K 9/2036; G06K 9/00892; G06K 9/00288; G06K 2209/401; G07C 9/00103; G07C 9/00087; G07C 9/00039; G07C 9/00031; G07C 9/00309; G07C 9/00; G06F 21/00
See application file for complete search history.

(56) References Cited

U.S. PATENT DOCUMENTS 7,796,013 B2 * 9/2010 Murakami ........... A61B 5/1171
340/5.52
9,413,852 B2 * 8/2016 Lawson ............. G05B 19/4185
(Continued)

FOREIGN PATENT DOCUMENTS

WO   WO 2015172124 A1 * 11/2015 ........... G06T 19/006

OTHER PUBLICATIONS

Non-Final Office Action in U.S. Appl. No. 15/174,198, dated Apr. 7, 2017; 15 pages.
(Continued)

*Primary Examiner* — Joseph P Hirl
*Assistant Examiner* — J. Brant Murphy
(74) *Attorney, Agent, or Firm* — Schmeiser, Olsen & Watts LLP

(57) ABSTRACT

Provided are a device, system, and method for multi-factor multi-biometric access control that authenticate a user based on at least one of what the user knows, what the user possesses and what unique physical, biological and physiological or biometric traits the user has, wherein the device includes a single sensor from which multi-biometric data is derived.

21 Claims, 9 Drawing Sheets

(51) Int. Cl.
  *G07C 9/00* (2006.01)
  *G06K 9/00* (2006.01)
  *G06K 9/20* (2006.01)
(52) U.S. Cl.
  CPC ....... *G06K 9/00892* (2013.01); *G06K 9/2036* (2013.01); *G07C 9/00* (2013.01); *G07C 9/00031* (2013.01); *G07C 9/00039* (2013.01); *G07C 9/00087* (2013.01); *G07C 9/00103* (2013.01); *G07C 9/00309* (2013.01); *G06K 2209/401* (2013.01)

(56) References Cited

U.S. PATENT DOCUMENTS

| | | | |
|---|---|---|---|
| 2003/0126465 A1* | 7/2003 | Tassone | H04L 63/102 726/4 |
| 2005/0258933 A1 | 11/2005 | Baker et al. | |
| 2006/0210119 A1* | 9/2006 | Willis | G06K 9/00892 382/115 |
| 2006/0274921 A1* | 12/2006 | Rowe | G06K 9/00033 382/124 |
| 2007/0030475 A1* | 2/2007 | Rowe | A61B 5/117 356/71 |
| 2010/0131279 A1* | 5/2010 | Pilz | G06F 21/32 704/273 |
| 2011/0276951 A1 | 11/2011 | Jain | |
| 2011/0310236 A1* | 12/2011 | Rowe | A61B 5/117 348/77 |
| 2012/0075452 A1* | 3/2012 | Ferren | G02B 13/0065 348/78 |
| 2012/0158454 A1 | 6/2012 | Saunders et al. | |
| 2012/0272313 A1* | 10/2012 | Ferren | G02B 13/0065 726/19 |
| 2012/0314911 A1* | 12/2012 | Paul | G06F 21/32 382/115 |
| 2013/0211559 A1* | 8/2013 | Lawson | G06Q 10/06315 700/83 |
| 2013/0212420 A1 | 8/2013 | Lawson et al. | |
| 2013/0214901 A1 | 8/2013 | Pineau et al. | |
| 2014/0258446 A1 | 9/2014 | Bursell | |
| 2014/0331278 A1* | 11/2014 | Tkachev | H04L 63/08 726/1 |
| 2014/0331282 A1* | 11/2014 | Tkachev | H04L 63/08 726/3 |
| 2014/0343918 A1 | 11/2014 | Grgic et al. | |
| 2015/0033305 A1* | 1/2015 | Shear | G06F 21/45 726/6 |
| 2015/0235074 A1* | 8/2015 | Zhang | G06K 9/00228 382/118 |
| 2015/0271033 A1 | 9/2015 | Srivastava et al. | |
| 2015/0324303 A1 | 11/2015 | Bogorad | |
| 2015/0324568 A1* | 11/2015 | Publicover | G06F 21/64 726/19 |
| 2015/0326570 A1* | 11/2015 | Publicover | G06F 21/64 726/4 |
| 2016/0239723 A1 | 8/2016 | Ge | |

OTHER PUBLICATIONS

Final Office Action in U.S. Appl. No. 15/174,198, dated Oct. 17, 2017; 16 pages.
Non-Final Office Action in U.S. Appl. No. 15/174,198, dated Apr. 23, 2018; 19 pages.
Final Office Action in U.S. Appl. No. 15/174,198 dated Mar. 27, 2019; 34 pages.

* cited by examiner

MULTI-FACTOR AND MULTI-MODE BIOMETRIC PHYSICAL ACCESS CONTROL DEVICE

RELATED APPLICATIONS

This application claims priority to U.S. Provisional Application Ser. No. 62/147,021, filed on Apr. 14, 2015 entitled "MULTI-FACTOR AND MULTI-MODE BIOMETRIC PHYSICAL ACCESS CONTROL DEVICE", the entirety of which is incorporated by reference herein. This application is related to U.S. Provisional Application Ser. No. 62/175,672, filed on June, 2015 entitled "WEB-CLOUD HOSTED UNIFIED PHYSICAL SECURITY SYSTEM", the entirety of which is incorporated by reference herein.

FIELD

The present inventive concepts relate generally to access control readers, and more specifically, to multi-factor multi-biometric electronic access control systems and methods.

BRIEF DESCRIPTION OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts. In the drawings.

BRIEF SUMMARY

Figure 1:
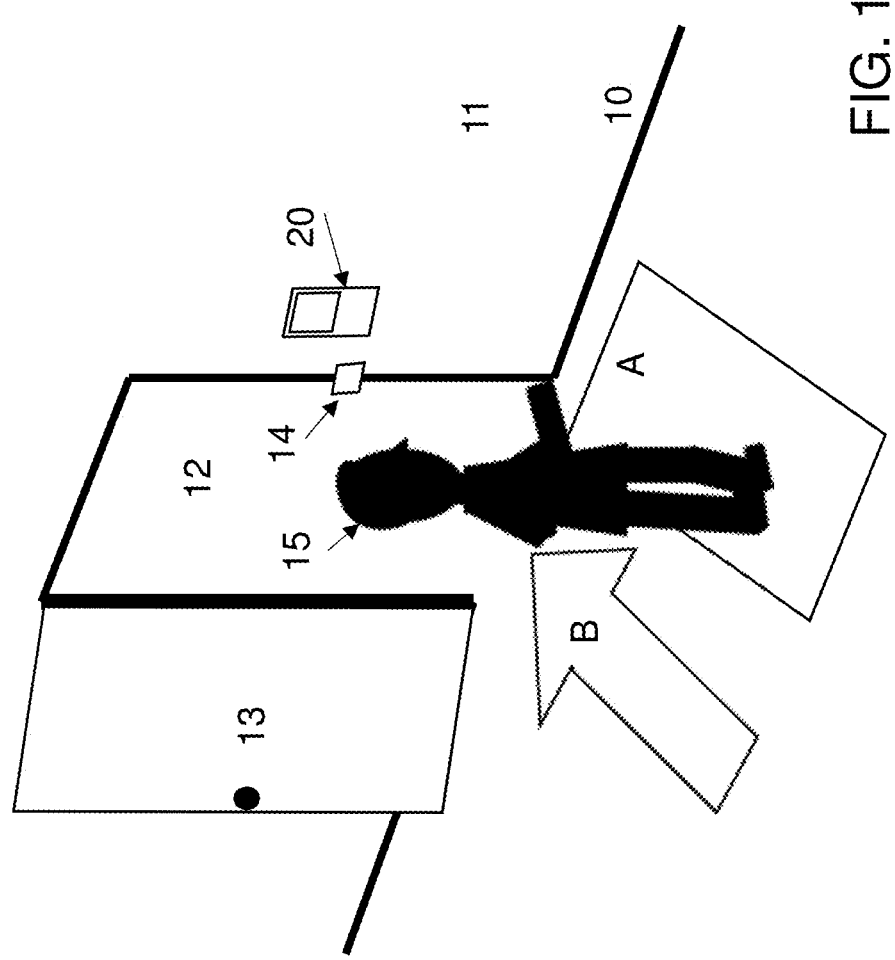
FIG. 1 illustrates a multi-factor multi-biometric electronic access control reader environment, in accordance with some embodiments.

In one aspect, provided is a multi-factor multi-biometric access control device, comprising: a processing device that authenticates a user based on at least one of what the user knows, what the user possesses and what unique physical, biological and physiological traits the user has; a common sensor that collects multiple and dissimilar-biometric signal data; and at least one hardware processor that analyzes from the multi-biometric data at least two dissimilar biometric signals related to a combination of at least two or more of an appearance, size, color, behavior, and physiology of the user; and that analyzes the dissimilar biometric signals to determine a biometric authentication.

In some embodiments, the device is configured to authenticate the user by at least one of what the user knows, what the user possesses and who the user is in response to at least one of a remote command and in response to analysis of the result of one or more of the authentication solutions and as a result of analysis of other data originating within the device.

In some embodiments, the at least one hardware processor interprets a behavior of the user approaching the device as an access request if the behavior includes at least one of the user pausing in front of the device and looking directly at the device and the user being a specified distance from the device.

In some embodiments, the multiple and dissimilar-biometric signal data are derived from a singular imaging system in integral to the device.

In some embodiments, the biometric data are derived from a plurality of sensors that may include two dimensional image and video data from a video sensor and three dimensional image and video data derived from a video sensor paired with a purpose built illuminator.

In some embodiments, the device includes an acoustic sensor that collects voice biometric data, and wherein the at least one hardware processor analyzes the voice biometric data.

In some embodiments, the at least one hardware processor performs at least one of speech recognition and speech synthesis.

In some embodiments, the at least one hardware processor determines biometric authentication of a user proximal to the device by at least one of locally comparing the user's biometric signals to those stored on the device and passing biometric signals from the device to a remote host for a remote biometric signal comparison.

In some embodiments, the device further comprises a light source that directs light at the user's face that originates with at least one of the device's display, a dedicated illumination source integral to the device, and a decoupled illumination source.

In some embodiments, an illumination projected by the light source on to the user may make use of at least one of directional and spectral and spatial and frequency control of light.

In some embodiments the Illumination source employed is at least one of synchronized to the camera frame rate, and triggered by an integral photo sensor, and triggered in response to the presence or analysis of the user's face image data.

In some embodiments, the device further comprises a camera, wherein the light source works in cooperation with the camera to at least one of derive three dimensional data of the area proximal to the user and produce three dimensional data of the user's face for subsequent analysis.

In some embodiments, the device includes a video intercom permitting a user proximal to the device and another remote person to at least one of see and hear and exchange at least one of visual and audible information with each other.

In some embodiments, the device accepts enrollment data from a remote device that issues the user with at least one of a unique knowledge based passkey and a unique possession based pass key and user biometric data so that a user may be pre-authorized to use the device for at least one of authentication or video intercom to gain access through a controlled portal or area.

In some embodiments, the device continuously surveils the area proximal to the controlled area by at least one of collecting and analyzing and storing and transferring at least one of images and video and audio data and metadata.

In some embodiments, the device illuminates the user in a manner designed to at least one of induce a retro-reflection from the user's eye and induce a physical involuntary response to the illumination.

In some embodiments, the device provides authentication for logical access control and other authentication purposes.

In some embodiments, the device produces an image of a face of the user who requests access by means of at least one of reconstructing biometric data to form a recognizable likeness of the user and capturing an image of the user and recalling a stored image of the user.

In another aspect, provided is a multi-factor multi-biometric access control device, comprising: a camera; a processor that serves all processing requirements; a lighting source that provides illumination of a face for biometric purposes; and a message board that conveys information that includes at least one of health and safety alarm notification and feedback to assist a user through an access process; and an access control reader to also serve as an alarm node for health and safety.

In some embodiments, the information includes a combination of messages, floor plans, time and weather.

In some embodiments, after authentication the message board conveys messages to the user, wherein a message is tailored to the user after the user's identity has been established.

In some embodiments, the device further conveys messages on display, prior to recognition, customized during recognition, and customized as a result of recognition.

In another aspect, provided is a method of automated multi-biometric multi-factor (MBMF) identification from a single device, wherein at least two biometric signals of voice, appearance, size, color, behavioral, and physiological aspects are combined in a manner so as to produce an authentication superior to that which can be achieved by any one biometric signal.

In another aspect, provided is a method of processing multi-biometric data resulting from a multi-biometric signal acquisition conducted on a single device wherein at least two individual biometric data signals are analyzed independently and subsequently combined to form a single multi-biometric characteristic descriptor whereas the method combining of signals is designed to optimize subsequent biometric authentication results.

In some embodiments, a multi-factor authentication results from at least one of the individual biometric signals and the combined multi-biometric descriptor and the data that describes the multi-biometric event wherein this data is at least one of stored and analyzed and modified by at least one of the device originating the data and other devices and a remote host.

DETAILED DESCRIPTION

Turning now to the drawings in which like reference characters indicate corresponding elements throughout the several views, attention is first directed to FIG. 1, which illustrates a multi-factor multi-biometric electronic access control reader environment, including a wall 10 having a surface 11. Wall 10 further includes an opening 12, a door 13 sized to be received within opening 12, and arranged to be opened and closed with respect to the opening 12. A locking mechanism 14 may secure door 13 to wall 10 when the door 13 is in a closed state, i.e., covering opening 12. More specifically, one side of the door 13 is hinged to a wall, and the other side of the door 13 when locked or in a closed state covers the opening 12 and is secured to wall 10 by the locking mechanism 14. The device embodying principles and features of the present inventive concepts and generally designated by the reference 20 is shown flush mounted to wall surface 11 and adjacent to door opening 12, but is not limited thereto.

A person 15 desiring to pass from an area on the side of the wall where device 20 is mounted to a contiguous area on the other side of wall 10 may momentarily present themselves before device 20 at location A, for example, at or near opening 12. Although not shown, the door 13 may be in the closed or locked state, i.e., preventing the person 15 from passing through the opening without requesting and being granted access. Device 20 may include security features, for example, including electronics for authenticating and authorizing access. For example, the device 20 may authenticate the identity of the person 15, something possessed by the person (16), and/or something known by the person. Accordingly, if device 20 approves access of person 15 through the door opening 12, then the device 20 can communicate with the locking mechanism 14 to unlock or otherwise enable passage of person 15 through door opening 12 along a path designated by the arrowed line B. In some embodiments, for example, described herein, device 20 is referred to as an Electronic Access Control (EAC) reader 20.

Alternatively, in embodiments where person 15 is confined to a wheel chair or other mechanical apparatus, the wheel chair or other mechanical apparatus is likewise positioned at location A to permit person 15 to momentarily face device 20.

Figure 2:
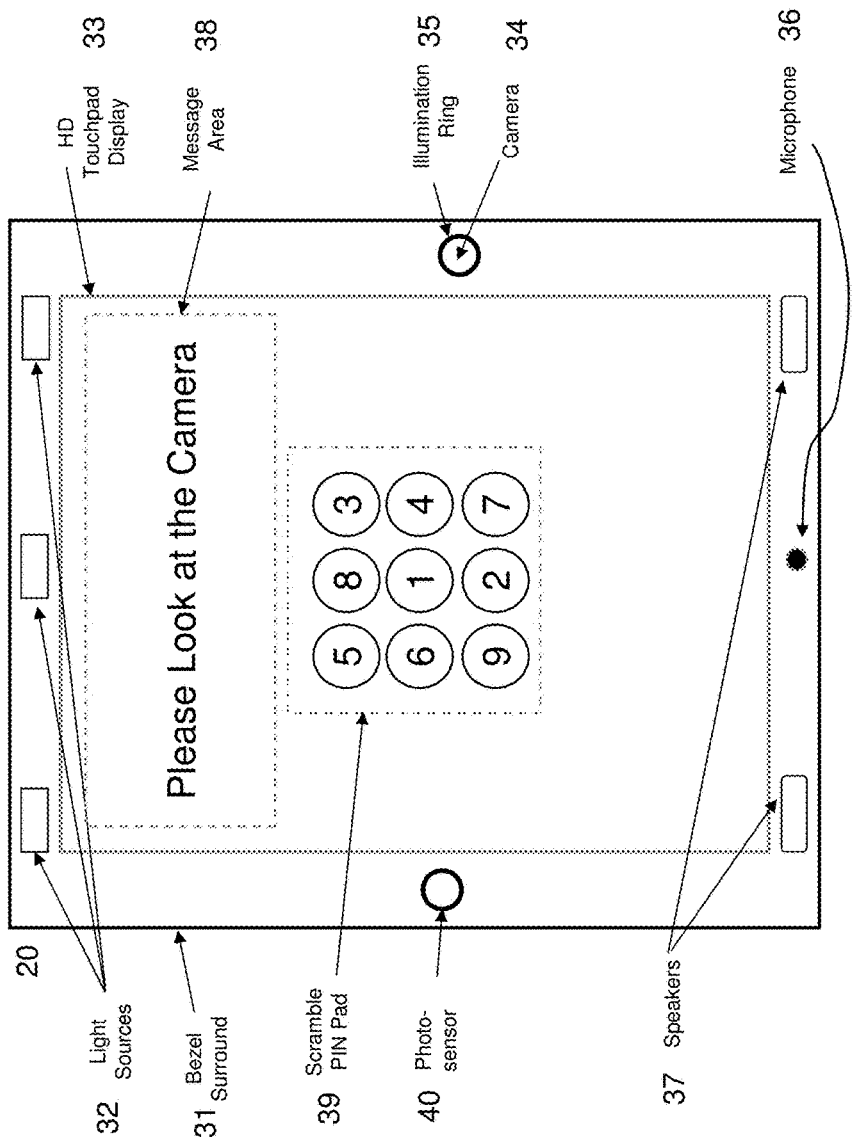
FIG. 2 is a view of a multi-factor multi-biometric (MFMB) electronic access control reader, in accordance with some embodiments.

As further viewed in FIG. 2, the device 20 illustrated in FIG. 1 may include but not be limited to a bezel or enclosure 31, one or more light sources 32 that may project a diffuse light or a structured light pattern in either a continuous or momentary light pulse on to the user, a touch screen display 33, one or more cameras 34 or related sensors that may operate in the visible spectrum or non-visible spectrum, a light source 35 to convey feedback to the user, a microphone 36, and one or more speaker 37. At the touchscreen display 33 there may, depending on the device configuration, be a display area 38 where text, message, graphics and video may be displayed for viewing by a user. The user interface of the display 33 may include a keypad 39 and/or other input/output device for entering data or a separate component may be used to gather data input such as a mechanical PIN pad. A photo-sensor 40 may be used to actively detect the ambient light proximal to the device 20 or the reflected light from person 15 or other tangible object of interest with respect to approving access through door opening 12. A possession sensor 41 may be used to receive a signal from or induce a signal to be generated from an object on the person.

The device 20 preferably has an enclosure form factor, for example, constructed and arranged to have a durable and professional housing, which in its simplest mode of operation fulfills the role of a traditional electronic access control (EAC) reader consistent within a traditional physical access control system (PACS) that controls access between two contiguous physical areas. This may involve for example controlling the access of people on foot through a portal (e.g., opening 12 shown in FIG. 1) secured with a locked door (e.g., door 13 shown in FIG. 1), or access of drivers and their vehicles through a gated portal.

In some embodiments, the device 20 is a multi-factor multi-biometric (MFMB) electronic access control (EAC) reader that can be positioned adjacent to an entrance of a secured portal, for example, illustrated at FIG. 1. The device 20 is designed to ensure that only authenticated personnel are permitted to pass through the portal to the contiguous secured area by verifying that users either convey a valid biometric signal such as a face scan originating with the video sensor 34 or voice scan originating with the microphone sensor 36, possess a valid credential, know something such as a valid Personal Identification Number (PIN) that can be conveyed via a PIN pad 39, or some combination thereof.

Users attempting access therefore assert at least one of: who they are (i.e., biometric authentication), what they have (i.e., possession authentication), or what they know (i.e., knowledge authentication) to the device. For example, submitting a biometric factor solution may consist of speaking a phrase that can be interpreted by voice recognition analytics, or presenting the face to the video camera 34 to later be processed by face recognition biometrics. In another example, submitting a solution to a knowledge authentication factor test may be performed by the user providing a verbal response which may be received by the microphone 36 and later analyzed by speech recognition software or typing authentication codes or the like via the PIN pad 39. In yet another example, the user may present something on their person or in their hand 16 that can be received by the possession sensor 41 and later analyzed to assess compliance with a possession factor test.

In response, the device 20 may either directly verify, or support the verification, that the asserted data is consistent with authorized access. Following adjudication, the device 20 can either directly or indirectly grant or deny access authorization. For example, the device (20) may operate in conjunction with a PACS controller module, whereby the device may pass the user authentication results to the PACS controller, and the controller may further evaluate if the authenticated user is authorized to pass through that specific portal at that time of day. Alternatively, the device (20) may also feature the functionality of a PACS controller and thereby be able to perform both the factor authentication and PACS authorization functions within one device.

The device 20 may create access event data for each access attempt. For example, authentication event data, access control operational data and alarm notifications may be sent to a cloud based system or a local PACS controller working in tandem with the device. Likewise, event data, calibration data, operational adjustments, etc. may be sent from the cloud-based system or local controller to the device 20.

The cloud may be implemented in a network, for example, a public switched telephone network (PSTN), a mobile communications network, a data network, such as a local area network (LAN) or wide area network (WAN), over the internet, or a combination thereof, or other communication network known to those of ordinary skill in the art.

Figure 3:
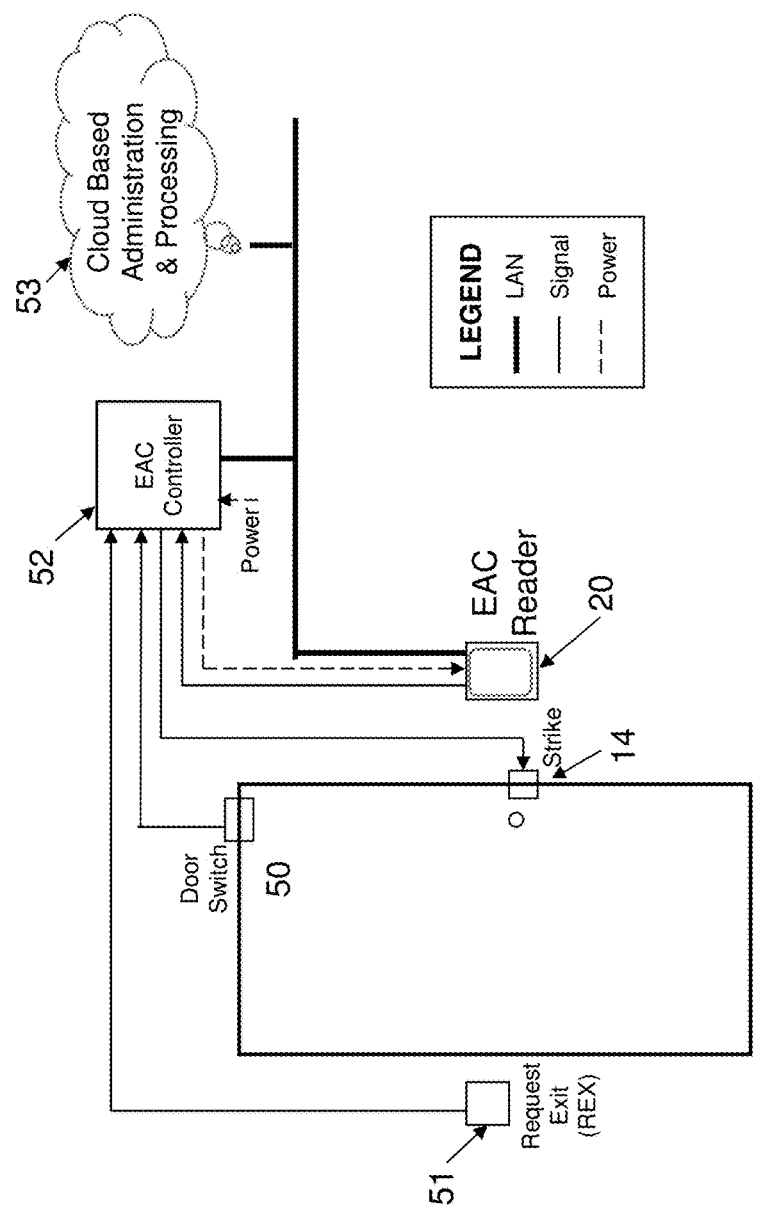
FIG. 3 is a view of a MFMB electronic access control device with decoupled controller, in accordance with some embodiments.

A conventional PACS is typically comprised of the following components as shown in FIG. 3:
  A door sensor 50 (i.e., door switch) that senses if the object blocking access through portal 13 (e.g., door or gate) is in place or possibly ajar.
  A locking mechanism 14 to provide a means of remotely securing and un-securing the object blocking access through the portal, e.g., by remote activation of a solenoid strike or energized magnets, or related elements.
  A momentary Request to Exit (REX) 51 switch allowing users passing from the secure side of the portal to the unsecure side to do so without the need to authenticate themselves.
  An EAC reader similar to or the same as device 20 illustrated in FIGS. 1 and 2 located on the non-secure interface between the two contiguous areas that, in its simplest form, reads the asserted identity of the user and either authenticates the user locally or passes the identifier to a controller unit 52 for remote authentication.
  The controller unit 52, also referred to as an EAC controller may be typically located within the secure area, and either receive the results of a reader authentication or compare the asserted identifier associated with a current access attempt using a special purpose hardware processor with stored identifiers to adjudicate on the authentication. Furthermore, the controller unit 52 may determine authorization by analyzing the prevailing rules for the portal to determine if access should be granted or denied based on at least one of user authorization for portal, portal location, time of day, prevailing security conditions, etc. The controller 52 can also actuate the mechanism unlocking the portal 14, monitor the status of the door and REX switches, and report access event data to a remote host 53.

Figure 4:
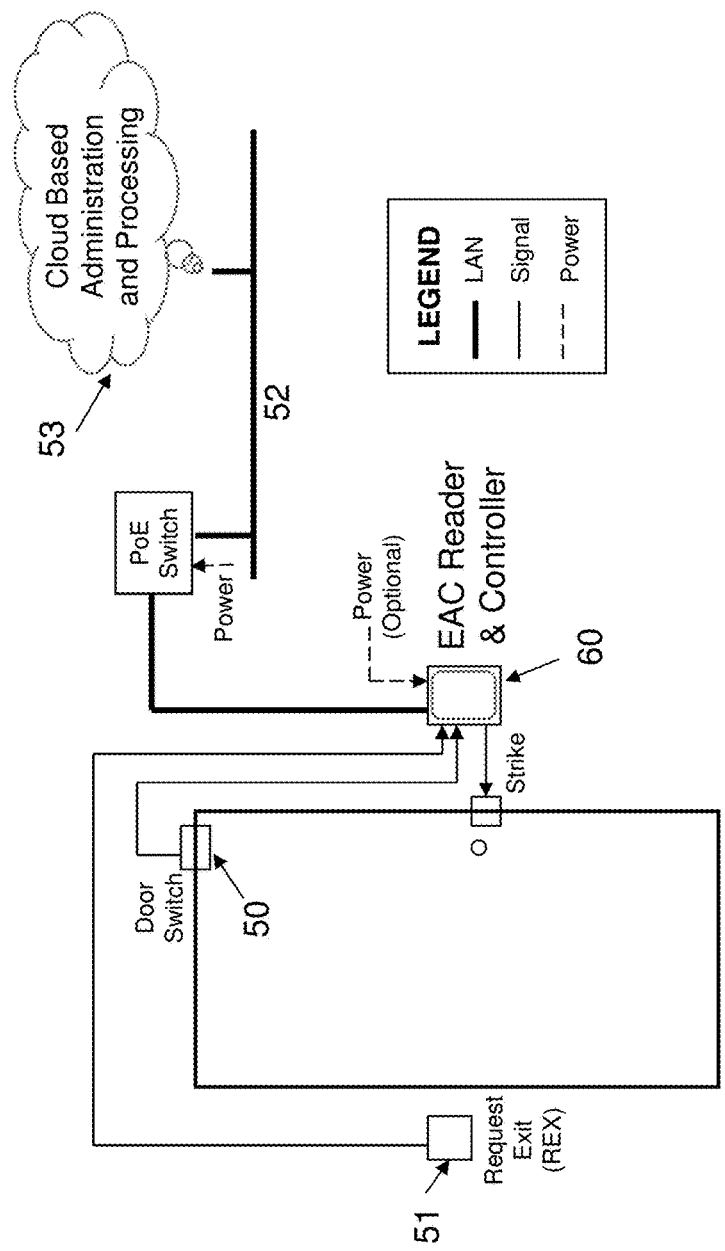
FIG. 4 is a view of a MFMB electronic access control device with integrated controller, in accordance with some embodiments.

Using the components in the configuration including an EAC reader 20 and decoupled controller 52, communication between the reader and controller may be implemented using an encrypted serial signal based on the well-known Wiegand protocol, an Internet Protocol such as open supervised device protocol (OSDP), and/or other known card reader technology. In one embodiment, the device 20 may also be in direct communication with a remote host 53, preferably a cloud based host, wherein data may be shared between the device and the remote host. In an alternative configuration, as shown in FIG. 4, an EAC reader 60 features an integrated controller, i.e., and may combine all the functionality of the reader and controller and be capable of monitoring the portal sensors 50 and 51, and controlling the portal, either as shown by directly actuating the portal lock 14 or alternatively actuating a wireless lock via wireless communications. This configuration does not necessarily require continuous real time communication with an external controller or administration terminal. In this configuration, a serial communication link is eschewed in favor of an internet, Ethernet or network link 52 that facilitates communication with a configuration and administration terminal that may be local or cloud based 53. In yet another embodiment, the device 20 may use the remote host 53 to support analysis of data collected at the device in support of the authentication and authorization. Therefore, the device according to some embodiments will control access between two physical areas by operating either independently (e.g., integrated controller) or the device 20 may work in concert with a supplementary PACS controller. In some embodiments, the system according to some embodiments of the inventive concepts, can be backwards compatible with interface standards old and new, and designed to either communicate via Wiegand, Ethernet, OSDP, and others and/or in combination with other communication protocols known to those of ordinary skill in the art.

The device 20 may accept from a user seeking access an asserted identity, or an authentication factor solution. The user may assert his or her identity at the reader by means of at least one of what the user physically possesses, what the user knows and can convey, or who the user is.

In some embodiments, the device will analyze at least one of the authentication factor tests to authenticate the user. In another embodiment, the factor solution accepted by the device may be forwarded to a remote terminal where authentication will be conducted.

In some embodiments, the reader will authorize the user, or in other words make the determination to grant or deny access locally (integrated controller) and in other embodiments the device will operate in concert with an external controller whereby the authorization is done remote from the device.

If the user is granted access to pass through the portal, then the portal will temporarily unlock or otherwise enable the user to pass through to the secure area. In a traditional PACS the duration the controlled portal remains unsecured is measured by the door switch sensor and compared with prescribed values so that an alarm will be generated if the portal remains non-secured beyond its prescribed limits.

Preferred Embodiment of Device as Physical Access Control Reader

In some embodiments, the device is designed to be a cost effective alternative to conventional access readers, including card readers satisfying the possession authentication factor test, while also vastly improving the level of both security and convenience. The device of the present inventive concepts may flush mount to the non-secure side of the controlled portal, and is capable of fulfilling the role of a traditional access reader with traditional outputs, but with a number of novel improvements over conventional readers ends.

In a preferred embodiment the access control device of this inventive concepts comprises the following major components:

A hardware processor
Data memory and storage
One or more sensors (some of which are illustrated in the device 20 shown in FIG. 2), which may include but not be limited to
    A camera system, of one or more cameras, capable capturing video and still images of the user in two dimensions, three dimensions or both. For example, one camera may be for three dimensional data, and another camera may be for two dimensional data.
    Speaker(s) and microphone (which may be of the noise cancellation type)
    Photo-sensor
    Accelerometers, barometer, gyroscope
    GPS sensors
    A possession sensor that may receive signals originating with the user requesting access where the sensor may use any variety of sensing technologies including but not limited to WiFi, Bluetooth (including BLE), Near Field Communications (NFC) and radio frequency identification (RFID) among others.
A light source for illuminating the user or parts of the user
A display which may feature touchscreen capability
An internal battery
A mechanical power and signal interface
One or more of authentication, authorization and event data output
A cable harness to provide power and communication to the device and components
    If Power Over Ethernet (PoE) is available, that may be used in lieu of, or in addition to, line power
A structure housing the components and facilitates mounting
Software that includes authentication technology, authorization technology or both that is executed by the processor and stored as program code in the memory.

The device may provide an unprecedented combination of high security and high convenience. To facilitate biometric authentication, the device may collect and analyze novel multi-biometric data signals derived from image and video data as well as biometric data derived from audio data. The unique biometric signals are concurrently collected, analyzed and thoughtfully combined to produce an aggregate biometric accuracy far superior to that which can be achieved with any one of the biometric signals employed. In a preferred embodiment, the multi-biometric signals are quickly collected from the user in a convenient hands free fashion, which simplifies the identity assertion, minimizes user learning requirements and accelerates the total authorization timeline.

To verify what the user knows a PIN pad may scramble the order of the displayed characters to frustrate nefarious character pattern observation, or virtual keyboard may collect and analyze user input data. To verify what the user has, the device may receive or induce sharing of wireless signals from a personal device in the possession of the user. The presence of all three of these authentication modes, namely, the ability to test what the user has, what the user knows, and who the user is, where biometric signals are multi-mode biometric, in a single device is novel, as is determining to use one, some or all of the modes in a single access event through automated means.

Conventional PACS readers may feature multi-factor, e.g., three factor, authentication, but in the current state of the art the biometric test is only authenticating one biometric signal type such as either a fingerprint, an iris pattern or a hand geometry pattern. It is acknowledged that conventional readers may measure more than one biometric signal of the same biometric type, for example matching more than one of the user's fingerprints or matching both irises or both hands. But this approach is limited by the fundamental limitations of each particular biometric. For example, a substantial fraction of the population does not have fingerprints suitable for automated recognition, and the majority that do can only achieve success with automated fingerprint scanners when the correct level of finger cleanliness and moisture is present. Likewise, the excessive expense of an iris scanner is not further justified through the use of measuring both irises. Likewise, the marginal accuracy of a hand geometry measurement is not improved in a meaningful way through measuring both hands. In all cases, submitting multiple biometric signals of the same type will protract the authentication timeline and detract from the perceived convenience of the authentication experience.

Embodiments of the present inventive concepts measure a plurality of dissimilar biometric signals concurrently with but a single hands-free gesture from the user. This inventive feature may be combined with a knowledge and possession authentication tests that highlight the inventive features of high security and high convenience. In sum, embodiments include a three factor authentication device that includes a common sensor that concurrently collects biometric signals of appearance, size, color, behavior and physiology, all through a single image, series of images or video, in accordance with multi-biometrics, and analyzes these dissimilar biometric signals for a more robust and accurate biometric authentication than can be achieved with without combination of these signals. Embodiments may also collect voice biometric signals from an acoustic sensor. The device in accordance with some embodiments features an extensive set of human input and output sensors and transducers to facilitate a feature rich user experience. The flexibility afforded by the diversity of sensors, powerful on board processing and sophisticated biometrics opens up the possibilities of several modes of operation beyond traditional physical access control. The device may transition seamlessly from one authentication mode to another, or in the course of executing its duties on one authentication mode, incorporate aspects of a dissimilar mode to enhance the aggregate user experience or device efficacy. In particular, authentication tests such as a knowledge based, possession based or multi-biometric based authentication that must be satisfied for physical access can be initialized to reflect the prevailing security conditions and may consist of one, two or all three factor tests where each test may have a unique level of scrutiny applied to the submitted factor test solutions. The device may dynamically adapt its security posture to meet changing security requirements and protocols, which may include normal operational, lock down or emergency conditions, and test and diagnostic conditions. In this manner the device may be commanded to adapt the factor tests and/or the strictness of each factor test being used to match prevailing security requirements.

Alternatively, the device may be configured to adapt the number, type and strictness of factor tests in response to events detected by the device itself. For example, if a user fails a knowledge based test in dramatic fashion, the system may require both a biometric and possession based test to permit access.

Power and Signal Interface:

The device may consume power supplied from at least one of an external power supply or source or an internal battery. The external power may interface to the device through at least one of a dedicated power port, a combination power and signal port (e.g., Universal Serial Bus [USB]) or a combination power and network port (e.g., Power over Ethernet [PoE]). The external power source in whatever form it takes may originate from the remote enclosure that houses the controller, a PoE switch or a dedicated transformer.

Signals conveyed via wired connections may interface with the device by at least one of conventional well-known serial protocols (e.g., USB), traditional network protocols (e.g., Ethernet) and industry standard serial protocols (e.g., Wiegand). Wireless signals may also, or alternatively, be employed and may include but not limited to at least one of Bluetooth™ (e.g., BLE 4.0), Near Field Communications (NFC) and a local wireless area network (WiFi).

Multi-Factor Authentication

Multi-factor authentication is a method of automated physical access control which requires a user to successfully pass at least two of the three possible authentication categories:

1. What the user knows (e.g., PIN, password, answer a question . . . )
2. What the user possesses (unique credential such as a card or proximity fob)
3. Who the user is (biometrics)

"By definition true multifactor authentication requires the use of solutions from two or more of the three categories of factors. Using multiple solutions from the same category . . . would not constitute multifactor authentication," according to Federal Financial Institutions Examination Council "Frequently Asked Questions on FFIEC Guidance on Authentication in an Internet Banking Environment", Aug. 15, 2006, incorporated herein by reference in its entirety. Each of these foregoing factors is in theory independent of the others, and therefore it is reasonable to suppose that a higher degree of confidence can be attributed to the aggregate authentication resulting from two or more of these factors than can be achieved by any one acting alone. From a security perspective, requiring the user to authenticate two or more factors increases the difficulty posed to a would-be user with an aim towards deceiving an access control system.

The device in some embodiments is capable of authenticating the user using any one, a combination of any two, or all three authentication types. Furthermore, beyond the scope of automated authentication, the device is also capable of instantiating a video intercom session that will connect the user with an administrator via two-way video and voice and thereby support a manual verification using one or more of the multi-factor authentication categories (e.g., ask the user a question, ask user to hold up a badge, recognize the user, etc.).

The device in some embodiments is capable of querying the user to share knowledge that can be used to authenticate the user's identity. Queries or instructions may be displayed on the touchpad display and the user inputs may be accepted through the device's touchpad, microphone or video sensor. The PIN and passphrase entry may be encrypted for transmission beyond the limits of the physical device. Furthermore, the device may in some embodiments include hardware, software, or a combination thereof that erases the stored valid PINs, passphrases and any security keys used if the device is tampered with, stolen or in some way compromised.

Figure 5:
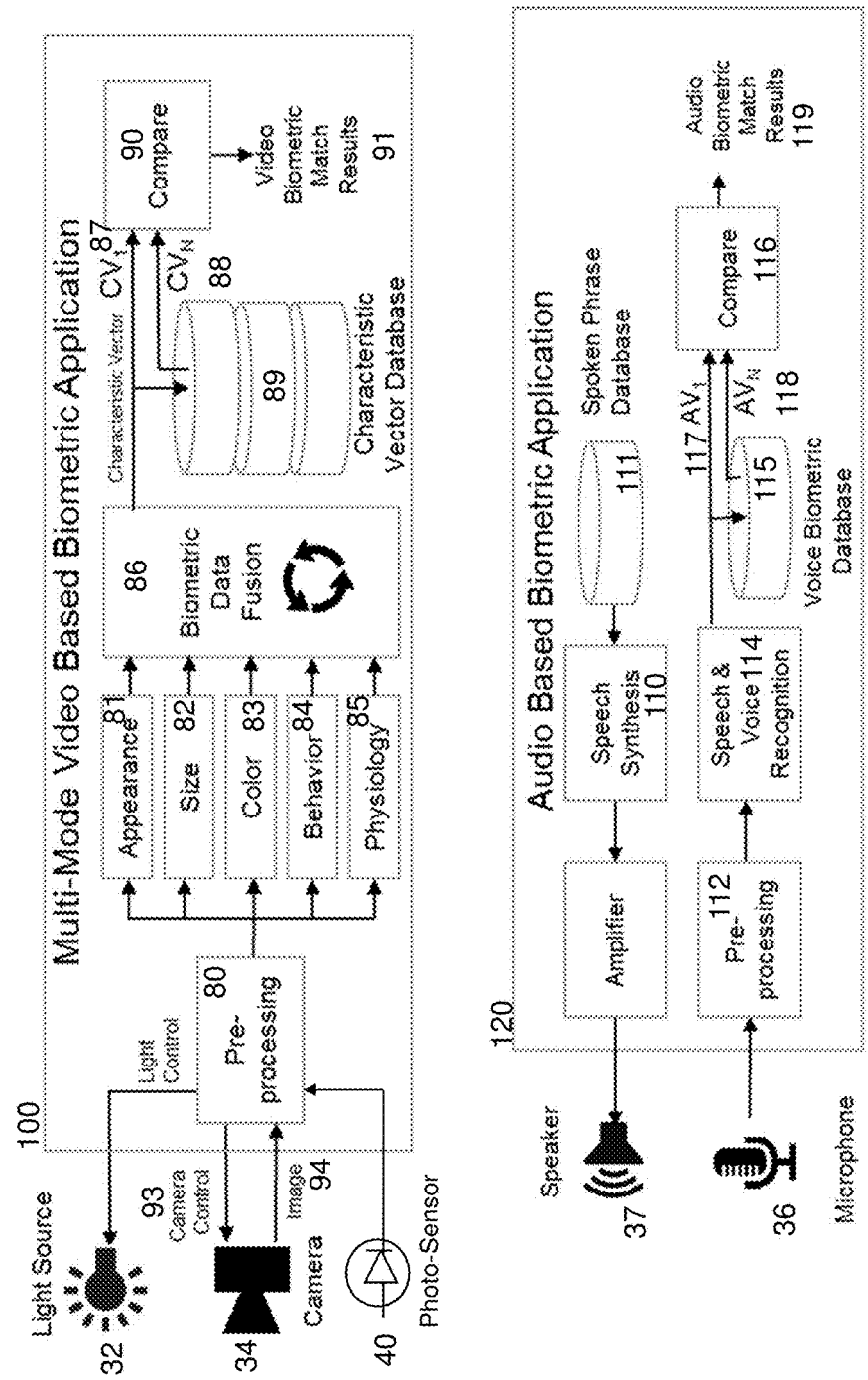
FIG. 5 is a view of a multi-mode biometric authentication, in accordance with some embodiments.

Alternatively, as shown in the multi-mode biometric authentication system of FIG. 5, queries or instructions can be annunciated via the speakers 37 of the device's audio system 120 in concert with speech synthesis 110, and user responses can be accepted through the spoken word to the microphone 36 in concert with the device's audio system and analyzed by speech recognition 113.

In some embodiments, the device can display a numerical PIN pad that accepts a unique identifier known only to authorized users. Entry of the PIN can be made more secure by the device displaying a scramble PIN pad, whereby the numbers are placed in a random position relative to each other for each access attempt, which will make it more difficult for unauthorized users who may observe the PIN entry to reconstruct the valid PIN.

In other embodiments, the device can display an alphanumeric PIN pad that allows a translation of numbers or letters and entry of PINs composed of numbers or letters or a combination thereof.

In yet another embodiment, the device can display a virtual keyboard that allows for the user to enter a password or passphrase composed of letter and symbols.

In foregoing embodiments, the PIN, password or passphrase may be something the user has memorized, or may be something the user must derive or recall as a result of being prompted by the device. For example, the device may prompt, "Please enter your department number." Or, "Please enter the last name of your Manager.

Figure 6:
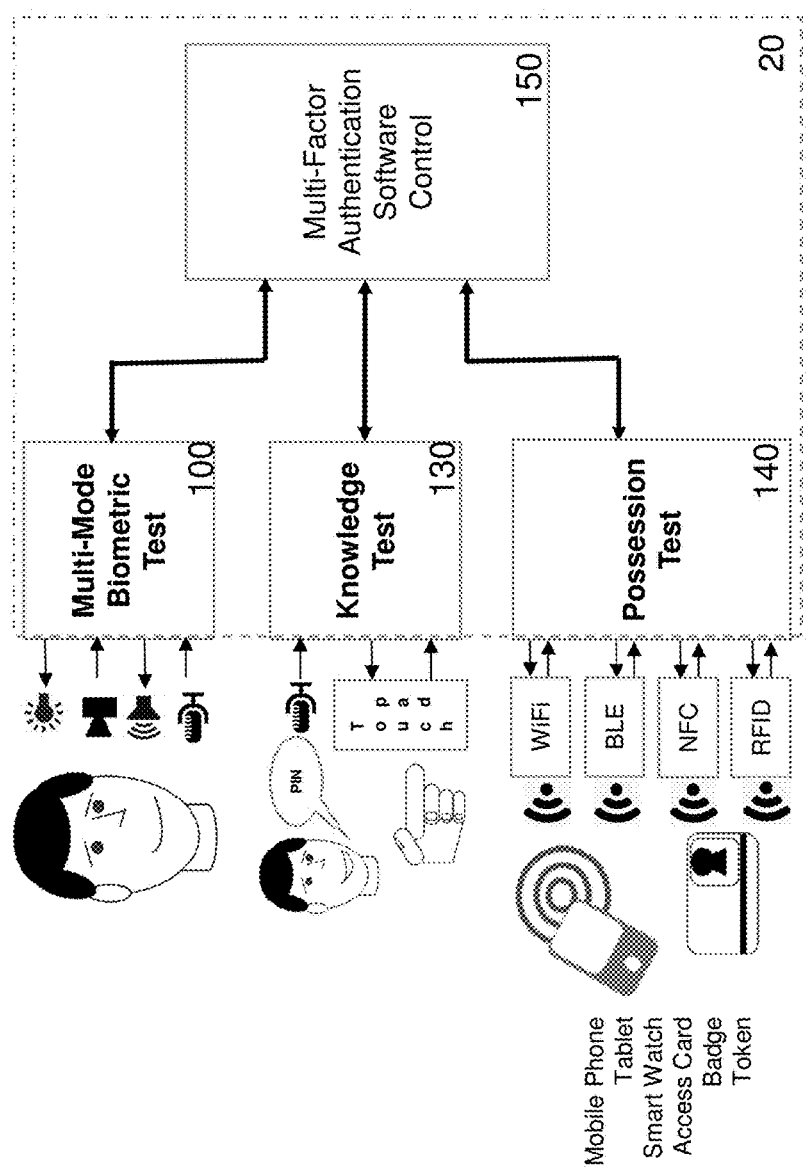
FIG. 6 is a view of a multi-factor authentication, in accordance with some embodiments.

As shown in FIG. 6, the device in some embodiments is capable of wirelessly receiving or exchanging data with a mobile or personal device (e.g., mobile phone, smart watch, tablet, etc.) in the user's possession. The access control device may survey for signals or personal networks that can convey the user's identification in response to an access request. Alternatively, the device may actively interrogate the user's device to induce an exchange of identification data in the course of an access request to satisfy a possession authentication factor test.

For instance, a standard personal network such as Bluetooth® or Bluetooth Low Energy™ (BLE) active on a personal device may be detected by the access control device thereby indicating the proximity of a potential user to the secure portal. The device of this invention may communicate with the personal device that is the origin of the personal network and listen for an ID assertion or actively prompt the mobile device for an ID. The user's unique identifier, security code, and so on may be conveyed to the access control device with the benefit of encryption to support an access request.

In other embodiments, the user may directly communicate with the access control device through active protocols such as Near Field Communication (NFC) or semi-passive means such as inductive field coupling as used in proximity cards. In this case the user requesting access would place the mobile device or access card proximate to the access control device so that communication between the two is possible and the unique identifier may be conveyed from the mobile device or access card to the access control device.

In yet another embodiment, a device or token may be provided that periodically generates a unique identifier that is synchronized with the access control system. In this case the user may manually enter in the token's displayed unique identifier by means of the access control device's touchpad, display the key to the device's camera or other sensors, or recite the key to the device's audio system.

The access control device in some embodiments may use wireless communications to support functions beyond the scope of physical security. In one instance the access control device may support a FMP—the "find me" profile—which allows the access control device to detect when a lost or stolen personal computing device is proximal to the portal. In another instance personal and mobile computing devices proximate to the portal may be allowed to receive notifications from the access control device such as incoming alerts and warnings. In yet another instance the access control device could serve as a server device to broadcast current time, date, weather conditions, etc. to all devices within wireless range.

Multi-Mode Biometrics

A technique that the device may employ will authenticate a user requesting access through a series of biometric tests. The methods employed by the device may require only that the user approach the device within a prescribed distance, and pause momentarily while looking in the general direction of the device's camera, or other sensor in communication with the device. The device automatically detects when somebody has presented themselves for access and uses this gesture as a trigger to commence multi-biometric authentication. Several dissimilar biometric signals may be collected through the device's camera sensor, analyzed independently by the device, and then the results of the analyses combined to form a highly accurate and robust multi-biometric characterization of the user. The biometric signals may be derived or originate from external sources, for example, described herein. This characterization is then compared by the device to the device's stored list of authorized users who have been previously characterized, or enrolled, in a consistent manner. If a sufficiently strong match is found then the biometric authentication is deemed satisfied and the user is subsequently authorized access in accordance with the portal's prevailing security protocol, which may be a protocol known to those of ordinary skill in the art.

In some embodiments, the device provides for a plurality of biometric signals to be collected from a single sensor, each being analyzed to produce a means of independently characterizing the user to some degree ranging from strong to weak, and then combined through advanced fusion techniques to produce a very strong characterization suitable for robust automated recognition that exceeds the performance of that which can be achieved without combining the signals. The fusion process may analyze the relative strength of each biometric component to dynamically ascertain the optimal means to combine the independent biometric signals. The means of fusion may also analyze historical biometric data of the user requesting access and other users previously biometrically characterized.

In addition to a multi-mode biometric system, FIG. 5 illustrates the steps taken to support video and audio based biometric authentication. The access control device that is featured in this invention in some embodiments uses a camera 34 or related sensing device, and possibly in conjunction with an illumination source, to create an image or image sequence of the user while the user is requesting access through the controlled portal. The image data 94 is analyzed by the device's onboard processor and software to biometrically authenticate the user. During the access attempt the device will concurrently develop a plurality of distinct biometric signals from a common sensor, e.g., camera, data. The device may use but not be limited to any one, any combination of two or more, or all of the following biometric signals to characterize the user:

1. Appearance
2. Size
3. Color
4. Behavior
5. Physiology

As described herein, a hardware processor of the system processes data related to the appearance, size, color, behavior, and/or physiology collected by the single sensor.

The unique numerical descriptors for each biometric mode may represent at least one of:

1. The degree to which the user matches appearance of the whole face or body or parts of the face and body in two dimensions, three dimensions or both,
2. A direct linear measurement or derivation of a linear measurement between two or more user characteristic features in two dimensions, three dimensions or both
3. Intensity and color data specific to a spatial region or regions of the user
4. Gestures, behaviors and mannerisms displayed by the user
5. Involuntary or otherwise innate human and normal characteristics difficult to control or mask The numerical descriptors that uniquely describe the user in each biometric category can be concatenated to form a single characteristic vector that represents the user at a particular moment of the access request. The individual biometric signals may be combined and processed in a flexible manner that accentuates the relative signal contributions to improve subsequent biometric matching performance. This characteristic vector (CV) 87 is a mathematical representation of the user that may take the form:

$$User_A = CV_A(App_1, App_2, \ldots App_N, Size_1, Size_2 \ldots Size_N, Color_1, Color_2 \ldots Color_N, Beh_1, Beh_2, \ldots Beh_N, Phys_1, Phys_2 \ldots Phys_N)$$

Once the characteristic vector has been generated, users are compared with each other and themselves by mathematically comparing 90 the respective characteristic vectors.

Therefore, the device can be constructed and arranged to execute some or all of a recognition process that may identify the user following the sequence:

1. User presents himself to the device
2. Device detects the user and interprets user's request for access
3. Device takes an image or series of images
4. Device derives biometric signals from the image or images
5. Device compares biometric signals to stored biometrics signals for all authorized users, guests, watch list, etc.
6. Device determines the closest match
7. If a match is sufficiently close to a person stored in the database, then the user is authenticated.
8. If the authenticated user is also authorized to pass through the portal, then the user may be granted access
9. If the authenticated user is a pre-registered guest, an alert may be sent to the host
10. If the authenticated user is on a watch list, an alert may be sent to security personnel Alternatively, the recognition process may authenticate and authorize the user following the sequence:

1. User presents himself to the device
2. User asserts identity through either a knowledge based or possession based input
3. Device takes an image or series of images
4. Device tests knowledge or possession factor solutions
5. If factor solution tests are satisfied, then the user is authenticated
6. If the user is authorized, then access is granted
7. An image or images of the user during the access attempt may be appended to the access event data The device may include hardware processors can be part of one or more special-purpose computers, such that execute computer program instructions which implement some or all steps of the recognition process, or other processes in accordance with some embodiments described herein.

During a preprocessing step 80, the ambient light field proximal to the user may be measured by a photo-sensor 40, and/or image or images 94 captured from the camera may be examined for general photographic quality with particular attention given the region of the face location. Preliminary analysis of the photo sensor and image data, and regions within the image, may induce the device to actuate a light source 32 to more fully illuminate the subject, or regions of the subject. Furthermore, the control of the camera may be dynamically adjusted in response to analysis of the scene data so as to modify the quality and pace of image data to be collected and processed for biometric recognition. These dynamic adjustments may include at least one of camera frame rate, amplitude compression level, spatial resolution, size and number of regions of interest, backlight compensation, gamma and exposure.

Alternatively, the light source 32 may be configured to illuminate the subject in a manner than can support derivation of three dimensional data, in which case the light source may be illuminated at all times to search for users or illuminated upon command. The light source may be used at times during the engagement, or throughout the engagement, to work in tandem with the camera to produce three dimensional data of the user, which may be in addition to the traditional two dimensional camera data or instead of the two dimensional data. For example, the light source may project a pattern of light on to the user that may later be interpreted 80 to reveal the three dimensional topography of the user. Alternatively, the light may be of such a type and nature that its transmission can be carefully synchronized with the camera so that when the timing of the light transmission and camera reception are analyzed 80 a three dimensional topography of the user may be derived. Two or more cameras may be used with or without active illumination to derive three dimensional data. Three dimensional data may be registered, or dimensionally associated with, two dimensional data.

An imaging system may process data related to each user who enrolls or attempts access with the device, to automatically generate at least one image that will be processed or recorded. The imaging system may be part of the sensor, or may be separate from the sensor.

Processing begins with a preprocess step in preparation for generating the CV. Preprocessing may include but not be limited to:

1. Detecting access request: The user may simply pause and face the device to request access and this gesture may be automatically recognized as an access attempt. If three dimensional data is used, the user's position relative to the device may also constitute, or factor in to, a perceived access request.
2. Face finding: The device automatically determines the location of the user's head and face in preparation for finding detail features on the face.
3. Feature Localization: The device automatically identifies and locates specific features on the face to support biometric measurements, face image registration and face image scaling. This process may support subsequent measurement, analysis and compensation of pose variations and off axis lighting components to help ensure repeatable and accurate recognition results. Feature localization may use two dimensional data, three dimensional data or a combination thereof.
4. Face cropping: The device may automatically bound the face area to define the region to receive subsequent detail processing.

The result of the preprocessing phase 80 may include a range or distance independent representation of the user's face as it appears in the reflected light field of the environment proximal to the access control device. The result may also include a three dimensional representation of at least one user feature, that may be located on the user's face, that may not necessarily be dependent on the environment proximate to the user.

In the appearance step 81, the appearance coefficients characterize the global appearance of the preprocessed face as it relates to a group of predetermined faces. In one embodiment a set of normalized basis functions forms may form a face space that is computed from a super set of preprocessed face images that comprise at least one of the user attempting access and authorized users and non-authorized users. The preprocessed face image of the user attempting access is projected onto the basis functions to produce a set of coefficients that represents the optimal characterization of the user in the face space. These coefficients are used as the appearance coefficients in the characteristic vector. In another embodiment, the appearance coefficients may characterize regions on the face that may enjoy a higher lower spatial and amplitude resolution than that of the global face appearance. In yet another embodiment, the appearance may be three dimensional in nature to include data on the topography of the user's face and may encompass a plurality of perspectives that characterize the user in variations of roll, pitch and yaw deviations from that of a normal or perpendicular perspective.

Size measurements 82 are derived from a variety of regions located on and/or within the user's head and body.

The user face image representation may be processed in a manner that is independent of range, so that specific measurements can be taken between localized features on the face to produce reliable and unique characteristics. These measurements may be of a one, two or three dimensional nature. Size measurement may also be collected and analyzed outside of the face region. The size measurements that most uniquely characterize the user contribute to the characteristic vector.

The color measurement 83 characterizes the color of specific regions on the user's face and body. Localized face features form the anchor points from which a set of regions of prescribed or dynamically derived size and location are analyzed in the color space. The user's characteristic color in specific regions of the face as perceived in the device's physical environment contribute to the characteristic vector.

Behavior data 84 can be derived from a single image or from a series of images. The subtle ways a user interacts with the device are in many ways repeatable and unique to the user and are therefore suitable for helping to characterize the user and discriminate the user from other users.

Detection of physiological dynamics 85 is useful to verify the user is alive and to thwart attempts at fraud. Measurement of physiological traits can be useful to help characterize the user. Physiological measurements include involuntary response to stimuli, for example dynamic changes in the direction of eye gaze or contraction of the pupil in response to illumination changes. Furthermore, the user's unique biometric heart rate signature, head movement in response to the force of blood to and from the head, and skin tone variations in response to blood pressure, may be quickly characterized by analyzing a series of images, and may represent data sufficiently unique to support recognition and discrimination.

The device automatically fuses 86 the independent biometric signals to optimize the relative contribution of each independent biometric signal used in characterizing the user to both optimize the resulting aggregate user characterization, and maximize the power to discriminate between users, by forming a more accurate and reliable representation of the user than can be achieved by any one biometric signal acting alone.

Each biometric signal may represent a unique facet of the same real-world object, namely, the user attempting access. The biometric signals are classifiers in their own right, varying in degrees from weak to strong. The relative strength of each biometric signal may vary with each access attempt for a given user, or vary from user to user. In some embodiments, the system automatically determines the optimal weight to assign to each biometric classifier contributing to the fusion process with an aim towards flexible and optimal characterization and accurate subsequent recognitions that can keep pace with changes in user appearance as well as changes in the environment proximal to the device.

Each newly created characteristic vector 87 can be compared with preexisting characteristic vectors 88 stored in a database 89. FIG. 5 shows the stored vectors within the device but these could alternatively reside outside of the device, such as in a PACS controller or in the cloud. Also the characteristic vectors could reside both within the device and outside the device concurrently. Vectors are compared 90 using a variety of geometrical and statistical techniques to produce a result 91 that is a measure of biometric similarity between two or more vectors. Likewise, this comparison could take place within the device as shown in FIG. 5 or outside of the device.

As described in embodiments herein, the device may accommodate multiple types of biometrics. For example, the device may be capable of voice biometrics that may operate either in conjunction with video based biometrics, to strengthen biometric authentication, or in lieu of video based biometrics, to serve as an alternative or back up authentication. The voice signal is detected by the device's microphone 36, conditioned by the device's audio pre-processing 112 and analyzed by voice biometric software 114 that may either reside locally on the device or remotely. Real time biometric voice data 117 is compared with historical biometric voice data 118 stored in a database 115 and compared 116 to produce a measured of voice biometric similarity 119. For example, speech and voice (biometric) recognition may be performed using signals generated by a microphone device 36. A video sensor device may be used for other biometric processing. Converting these signals from the microphone and video devices, respective to biometric data may be performed by the audio system 120 and/or video application 100.

The user may be prompted through the device's display 33 or audio system 120 to recite a specific pass phrase which will be analyzed and compared with stored biometric data to ascertain the identity of the user.

Referring once again to FIG. 2, the device may feature video display 33, speaker(s) 37 and microphone 36 that can serve a plurality of purposes depending on the device's prevailing operational mode. The device may display messages, graphics, video, etc. 38 in response to external control, or local control, and this display may change with each step of the access functional sequence (e.g., idle mode, steps during access request, access result, etc.). Messages may be tailored to alert persons proximate to the device of local conditions (weather, corporate events, etc.), act as auxiliary notification nodes for emergency events (e.g., fire, $CO_2$, lock down, etc.) or be tailored to specific users in response to recognition (e.g., "Good morning Liam, please check in with Legal at your earliest . . . ").

For example, while the device is idle or in a related state, or waiting for an access attempt, the device may display a corporate logo, location associated with portal (e.g. room number), information of interest to users and non-users such as current weather and forecasts, etc. During an access attempt the display may visually or audibly convey instructions to the user to facilitate rapid throughput such as "Please Enter PIN," or "Access Granted" or "Please look at the Camera." After access has been granted the display could convey instructions specific to the user such as "Welcome Erin, Please Check In with Human Resources." In a protracted access attempt, or in response to an access denied event, or in response to a user request, the device could support a video intercom session where the user could see and speak with an administrator, guard, or other person. Furthermore, the microphone and speech recognition hardware, software, or combination thereof provide an approach for the user to speak commands to the device, and the speaker may be used to convey words, tones, alarms, etc. both in support of access control and beyond the scope of the device's access control duties.

In some embodiments, the device may feature a touchpad 33 or the like to enable the user to tactilely interact with the device. Before an access attempt this feature could be used to request administrator assistance, peruse a floor plan of the facility, scroll through an employee directory, etc. During an access attempt the touchpad may facilitate entry of a user PIN (if required by security protocol), name, etc. During or following a failed access attempt the touchpad can be used to request a video intercom session to assist with exception handling.

The device may include a camera 34 or related sensing device capable of producing video and still images. It may be desirable to have the user's gaze directly aligned with the camera to achieve optimal biometric signal capture for some of the several biometrics modes. Therefore, the device may employ features designed to draw and hold the user's attention as close to the camera location as possible. This may take the form of rendering an item of interest on the display closest to the camera such as a progress bar that indicates that status of authentication, or by placement of a small light source 32 in the device bezel adjacent to the camera 34, or by placement of a circular light ring that surrounds the camera 34. These features can be illuminated, either in steady state or made to blink or flash, in monochrome or multi-color, at any time for a variety of purposes, for example while the device is capturing images used for biometric authentication. The light source 32 may replace traditional access reader PASS, PROGRESS or FAIL LED indicators, while also serving to induce the desired behavior. Therefore, when the user's attention to the camera 34 is provided, at least one of a ring of light may be formed around the camera that may illuminate, flash, cycle, rotate in a controlled intensity, duration and spectrum so as to draw and hold the user's attention directly at the camera 34.

The device is inherently insusceptible to granting unauthenticated access to those who would take deliberate actions to deceive the system. The very nature of the multi-mode biometric tests makes it extremely unlikely that presenting an image, displayed video or tangible model could result in access being granted and would therefore require a very high degree of concurrent correlation in all biometric tests of appearance, size (may include 3D data), color, behavior and physiology.

The device is capable of directly testing for spoofing using devices that may perform:

1. Detecting the user's heart rate through video data
2. A flash or momentary light of a prescribed intensity and spectral composition may be directed at the user requesting access to induce a retro-reflection from the front or back of one or both of the user's eye ball or retina. The unique reflection resulting from each eye, and two eyes together, is known for being extremely difficult to reproduce in the absence of a real person requesting access.

The device may detect when it is being tampered with or has in fact been removed from its authorized location. The device makes use of a variety of onboard sensors including at least one of accelerometers, position sensors, motion sensors, GPS sensors, WiFi signal strength relative to WiFi access points, microphone (seismic), compass, etc. One or more of these sensors may be part of a single common sensor. These sensors may detect when the device is shaken, reoriented, translated or moved in any meaningful way from its fixed mounting point. Furthermore, if the access control device is physically removed from its mounting point, for example, the wall 13 shown in FIG. 1, its location can be ascertained and tracked through use of these sensors such as Wi-Fi signal strength, GPS location data, etc.

The device may provide non-automated identity verification to complement automated authentication. A bi-directional live audio and video conference call, or video intercom session, may be supported between the access control device and a computing device such as a desktop computer, tablet, mobile phone, smart watch, etc. This link provides a means for an administrator or other user to see and speak with the user requesting access and make a determination on whether access should be granted. Furthermore, the device provides the means to accept a remote command, such as from an administrator or other user, to momentarily grant access through the controlled portal.

Examples of Operation

Enrollment

An administrator or other person may enter user data to a remote administration application in a manner consistent with conventional access control systems. Data fields may include but not be limited to user name, access rights, etc. The administrator will also collect a face image or images of the user that may contain two or three dimensional data, and may collect voice data. This biometric data may be collected with the access control device of the present inventive concepts or some other image and voice capture device. The biometric image and voice data collected for enrollment is then reduced to a characteristic vector in the same manner as done by the access control devices located at secured portals as described by the present inventive concepts. The administrator will also do what is necessary to ensure the user's personal mobile device is able to authenticate itself with the device of the present inventive concepts. Finally, the administrator may issue a PIN, password or passphrase to the user. In this manner, during enrollment the administrator may collect biometric data, and issue to or collect from the user knowledge or possession based authentication solutions.

User enrollment data including at least one of the characteristic vectors, a knowledge solution (such as secure PINs, passwords or phrases) and a possession solution (such as a secure mobile device authentication data) is forwarded to each device of the present inventive concepts that the user will be authorized to use. In this manner, the device is primed and ready to authenticate the user through all applicable multi-factor authentication tests.

Authentication

The authorized user who desires to gain access through a portal controlled by the device in accordance with embodiments of the inventive concepts shall approach the device, and momentarily pause and face the device, to signal to the device that access is requested. The device continuously monitors, or is triggered to monitor, the area proximate to the controlled portal for signs or gestures of an access request which may include the user requesting access simply stand at or pass through a predetermined range from the device. Therefore, traditional means of presenting a card, PIN, fob or placement of a physical digit or member are supplanted by the gesture of the user momentarily looking at the device to request access. This behavior is interpreted by the device as a request for access, and the nearest face that is centered in the device Field of View (FoV), facing the camera, and momentarily paused is interpreted as a user requesting access. Once an access request is detected the device will respond with an authentication test in accordance with the prevailing security protocols. Authentication tests will include at least one of a biometric identification or verification, a knowledge based test, or a possession based test.

Active Lighting

Referring again to FIG. 2, illumination may be projected onto the user's face during the access request by at least one of controlling the intensity level of the access control device display 33, actuating the device light source 32 and actuating a decoupled illumination source. Illumination may be at least one of directionally normal to the user's face, off axis relative to the face, and dynamically switched between two or more axes relative to the face. Illumination produced may possess the properties of being spatially diffuse, exhibit spatial patterns, be composed of some specific spectrum, or combinations of specific wavelengths, and may last for some specific duration or cycle at a periodic frequency. The illumination may produce the desired results of projecting a spatial pattern onto the user's face that can be used to derive three dimensional information of the face, spectral correction, on-axis or off-axis illumination, or may stimulate a specific physical, behavioral or physiological response. The illumination source may be synchronized to the device's camera by a camera control 93 to reduce the user's perceived illumination intensity or to support analysis of the face such as through time of flight analysis in support of producing three dimensional data. Referring to FIG. 5 the device 20 may autonomously determine if and when the illumination source 32 or 33 shall be used based on preprocessing 80 the image data 94. This decision may be influenced by data from the device's photo sensor 40 which may act in either a DC mode to measure the ambient light level of the area proximal to the user or in an AC mode such as to detect motion in the area proximal to the user, or determined by analyzing the user's face image or other content detected by the device's camera 34. Alternatively, the light source 32 may always illuminate the area proximal to the device and thereby for example use three dimensional data to determine if a user is present and requesting access. In some embodiments, the photo sensor 40 may be part of a common sensor, which collects multiple and dissimilar-biometric signal data. Thus, in some embodiments, the camera 34 and light source 32 may be constructed and arranged for two dimensional or three dimensional processing. In other embodiments, the system includes two cameras and two light sources.

Adaptive Learning

The device may operate in a stand-alone configuration, or interact with a remote host, or in harmonious concert with other like devices under the direction of preferably a cloud based host. Whether the device operates on its own or with other devices, the device may collect, analyze and exploit data collected from historical access attempts to maintain or improve technical performance.

Figure 7:
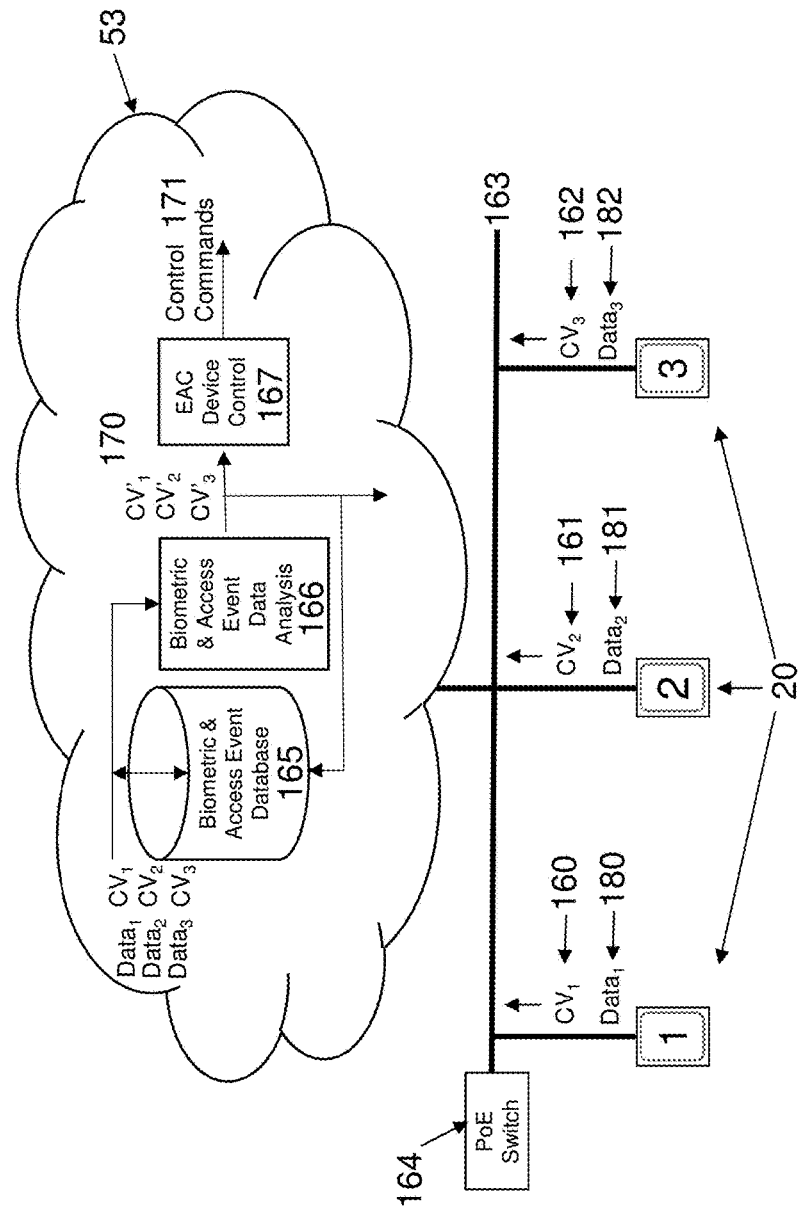
FIG. 7 is a view of a remote processing of multi-factor multi-biometric electronic access control data, in accordance with some embodiments.

FIG. 7 relates to concepts such as processing multi-biometric data locally at the device and remotely in the cloud, or sharing analyzed biometric data and device operational parameters based on analyzed biometric data back to devices. Referring to FIG. 7, access control event data and biometric event data 180 may include at least one of the data that uniquely identifies the access attempt such as door number, location, time of day and timing of key intra-access events, solutions to all factor tests submitted, measure of how accurately users were characterized, the measure of how accurately users could be distinguished amongst themselves, a characterization of the temporal variations in the users' characterizations, the prevailing ambient environmental conditions proximate to the controlled portal, a raw data image (either two or three dimensional) of the user attempting access, a synthesized image (either two or three dimensional) of the user attempting access, and multi-biometric comparison results. Each device 20 may also produce at least one characteristic vector 160 in response to each access attempt. Each device may analyze the access control event data and biometric event data 180 and characteristic vector(s) 160 to glean insights into the device efficacy. In response the device will make adjustments to how multi-factor and multi-biometric tests are applied to sustain the highest levels of technical performance, security and convenience.

Referring again to FIG. 7, in a system of devices, enrollment data including all factor tests to be employed and their solutions, which may also include multi-biometric data, and device operational parameters, can be distributed to each device for which the user is authorized to use from preferably a cloud based host. Each time the user exercises a fielded device, access event data and biometric event data 180 and biometric data 160 is shared with a host management system where the host system may also analyze access control event and biometric event data 180 and biometric data 160. Results of analysis may be shared with each device in the system resulting in adjustments to access control and biometric operating parameters so that each device may subsequently benefit from the data analysis of other devices. The result of the host analysis may for example reveal insights into how each particular device may best modify its multi-biometric computations to more accurately characterize each user as perceived in each device's unique environment and at specific times of day. For example, as shown in FIG. 7, three devices 20 may receive power and communication from a PoE network switch 164 and communicate with each other and a cloud based host 53 via a network or internet connection 163. As a result of access attempts at each device 20 a characteristic vector is produced 160, 161, and 162 along with the access control event data and biometric access data 180, 181, and 182. Characteristic vectors and access control biometric event data are shared with the cloud based host 53 where the data is stored in a database 165. Biometric data may be analyzed 166 to determine what adjustments, additions and modifications can be made to the characteristic vectors to improve automated recognition and discrimination.

Furthermore, access event data can be also be remotely stored 165 and analyzed 165, whereas the results of access event data analysis 171 can be re-distributed to all devices working together. In this manner devices may make adjustments in the type of factor tests, how the tests are conducted, and strictness of factor tests results, to best sustain robust and accurate technical performance. Particular attention may be given to multi-biometric variations over time for each device as well as multi-biometric variations across devices. In this manner the system of devices will be better able to perpetually characterize each user and each device will benefit from the usage of other devices.

Furthermore, devices can be accessed and controlled remotely. For example, a remote administrator with access to the cloud host 53 or network 163 may be able to command a device to unsecure the device's portal, or display a particular message, or illuminate the portal environment.

Access Control Reader with Dynamic Security Posture

The device may authenticate a user requesting access by any one or combination of the multi-factor tests. As shown in FIG. 6, the three authentication factor tests may include but not be limited to a multi-mode biometric test 100, a knowledge based test 130, and a possession based test 140.

The security posture of device, defined by the number of factors required and degree of correctness required of each test result, may be set manually by an administrator, may be set semi-automatically in response to a threat level or prevailing security conditions, or be set in a wholly autonomously manner in response to onboard analysis of real time and historical access control event data and sensor data. The device may be configured to apply one or more authentication tests based on the results of tests conducted in the current access attempt or with the benefit of data describing historical access attempts.

Furthermore, in response to prevailing security conditions, the device may be configured to authenticate the user through a particular factor test or through a combination of factors that reflect the prevailing security conditions. For example, while low security is deemed appropriate, the device may only prompt users for a PIN or credential. Alternatively, in a high security mode the device may require a biometric test combined with at least one of a knowledge based or possession based test. The degree of success of a test, for example how well the user's biometric signal matches to their enrolled biometric signal, may also serve to influence what additional tests the device will invoke to best meet the degree of security desired, and to what degree that those tests must be effective. For example, if the biometric test 100 fails to uniquely identify a user within prescribed limits, but fails by a small margin, then the device may prompt the user for at least one of the other factor tests 130, 140, so that the combination of a close biometric match with a correct alternative factor solution meets the prevailing security requirements.

Modes of Operation

Physical Access Control (with and without Controller)

The complete cycle of an access event using the device of embodiments of the present inventive concepts may follow the following sequence, offered as a means of example and not of limitation:

Device displays general messages on display in idle mode

Device searches for an access request, for example, by performing an analysis of motion detection data or two or three dimensional image or video data.

User approaches device and pauses while facing device.

Device recognized access attempt, for example, by determining the range to the user and the user's facial pose.

Device decides whether external illumination is required and actuates illumination if required. In embodiments where three dimensional data is being used then some form of active illumination may already be in use.

Device commences a liveness or anti-spoofing test regime.

Device commences video multi-biometric identification.
  Device displays video, lights and other signals appropriate during recognition tests to give feedback to the user and guide the user through the data collection process.
  If video multi-biometric test fails or is inconclusive device commences audio biometric test and prompts user to articulate a word or phrase.
  Possibly also in tandem with knowledge or possession based test If authentication is established the device:
  Un-secures the portal momentarily if it features an integrated access controller, or sends signal to remote controller to un-secure the portal;
  Conveys appropriate audio, video, illumination and other signals to the user signaling access has been granted and the user is clear to pass through the portal; and/or
  Measures the time the portal is un-secure and alarms if time exceeds prescribed limits.

Creates an event log.

Sends access event data and authentication event data to a remote, preferably cloud based, archive host via internet connection.

The device in accordance with some embodiments can fulfill the role of a physical access control reader in several ways. As has been previously described the device may subject the user requesting access to authenticate himself by some combination of multi-factor or multi-biometric test. If authentication is established, in one instance the device may output a conventional encrypted serial signal (Wiegand), OSDP signal or some other standards based access control signal to a remotely located door controller. In this instance the door controller will analyze the incoming' signal, and if access is approved, then the controller will actuate the locking mechanism at the portal to permit the user access.

In another instance, the device itself may contain the functionality of the door controller. In this instance the device monitors door sensors such as the door switch and REX switch, and actuates unlocking of the portal directly.

Video Intercom

Figure 8:
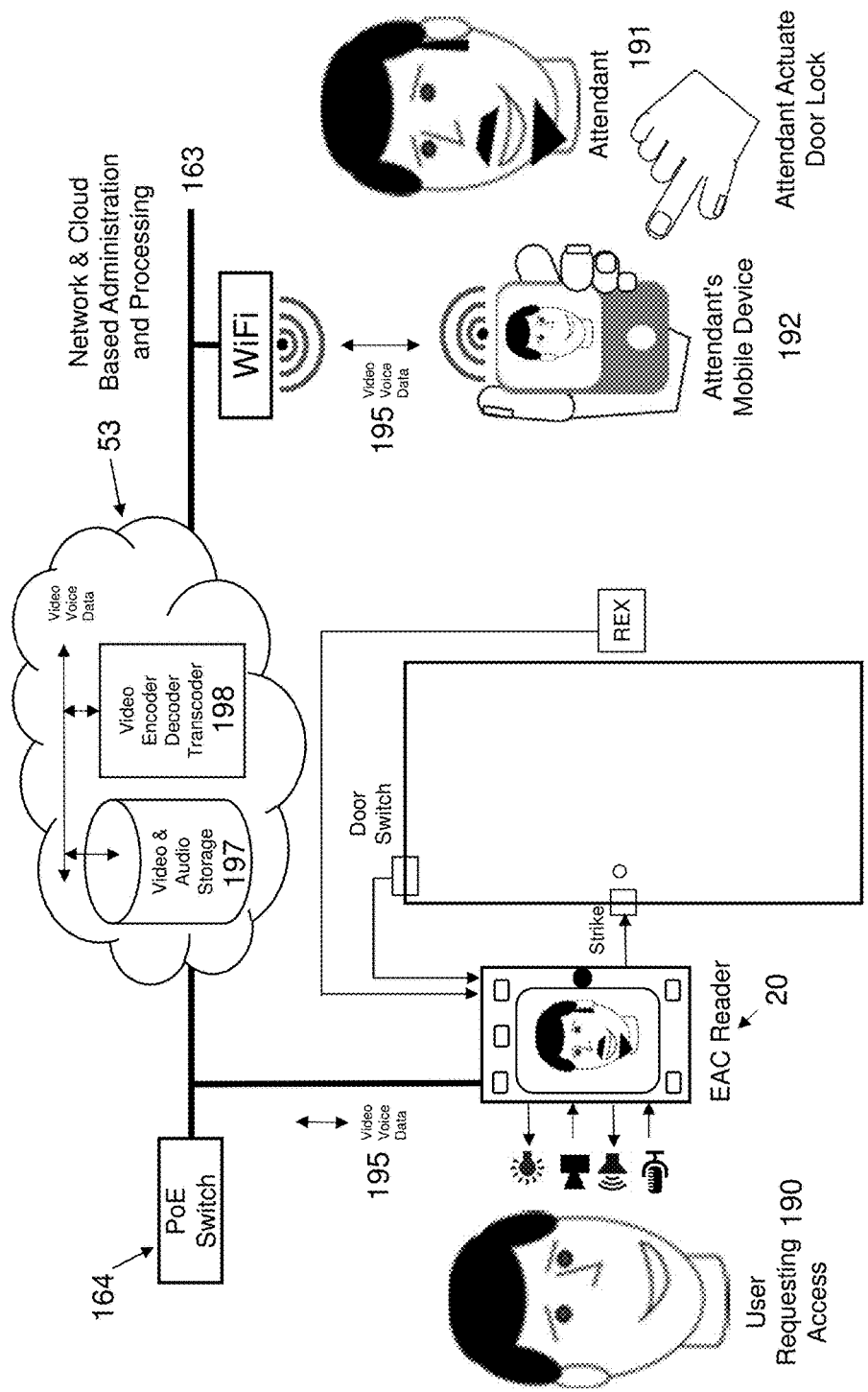
FIG. 8 is a view of a video intercom mode for multi-factor multi-biometric reader with integrated controller, in accordance with some embodiments.

The device in accordance with some embodiments may fulfill the role of a special purpose video intercom. As shown in FIG. 8, the device may use a two-way video channel and two-way audio channel to provide a means for a user 190 proximal to the device 20 to see and hear in real time a remote party 191 who possess means to share video and audio through a device 192. A video intercom session may be triggered automatically by events proximate to the controlled portal as sensed by the access control device 20, or in response to analysis conducted by the access control device or across a plurality of access control devices, or manually instantiated by a person either proximate to the access control device 190 or by a remote person 191 who desires to communicate with the somebody proximate to the device.

The user 190 proximal to the device may share real time audio, video and data input to the device (such as tactile inputs) 195 communicated over a network 163, supported preferably by a PoE switch 164, with other devices 192 capable of communicating and the host preferably in the cloud 53. Audio, video and device input data 195 may be stored in a cloud database 197, while audio and video may be at least one of encoded, decoded and transcoded in the cloud 198.

The result of a video intercom session may result in actuation of mechanisms within the device or proximal to the device (e.g., lighting, door solenoid, etc.), analysis of sensor data originating from device sensors and other locations (bar code scanning, video analytics, additional biometrics. etc.). Video and audio content of the intercom session may be recorded locally by the device or remotely by the host, analyzed by automated means, and archived locally or remotely.

Video Surveillance Mode

The device in accordance with some embodiments can serve as a surveillance node and collect audio and video data of the area proximal to the controlled portal. The device may store the surveillance video, which may be two or three dimensional video, locally and may automatically analyze the video content. The device may encode and serve up digital video, as well as video analytic metadata, and stream it for external viewing, storage and analysis.

Time and Attendance

The device in accordance with some embodiments may fulfill the role of a basic time clock as used in Time and Attendance applications. The user may behave in the same manner as described for an access attempt, and will receive confirmation that his attendance been verified and he has successfully either "timed in" or "timed out" of his work shift.

The advantages of a rapid and convenient hands free biometric or multi-factor time clock mirror the advantages in an access control application. Biometric time clocks are effective in curtailing fraud such as "buddy clocking" and ghost employees and multi-factor authentication I is inherently more secure than single factor authentication.

Visitor Management

The device in accordance with some embodiments may recognize pre-enrolled or recurring visitors and guests using the same multi-factor multi-biometric tests described for authenticating access control users. For example, visitors may be assigned a PIN or passphrase, or have a code sent to their personal mobile device to support knowledge based and possession based tests respectively. Visitors may also submit a photo of themselves, or when possible a three dimensional data file of their face, which may be used by aspects of the multi-biometric analysis. In this way the Visitor is likely to be authenticated by at least one of the three factors, and on subsequent visits the authentication will benefit from the historical biometric data that has been captured and exploited by the device. The video intercom previously describe may also be a desirable feature for the visitor management application. Finally, the visitor's host may remotely unsecure the portal allowing the visitor access to the secured area as part of the visitor protocol or to override the protocol.

Fire and Life Safety Applications

The device in accordance with some embodiments may support facility fire and life safety systems by acting as an auxiliary notification node to those systems to alert occupants to dangerous conditions and direct them to safety. The device's display can be used to convey messages to occupants that may describe the nature of the alarm and recommend actions to be taken. The display could illustrate the location of the occupant and direct the safest means of egress.

Furthermore, the device may use its audio and lighting capabilities to flash a warning signal and sound off an audible alarm to alert occupants to danger. Similarly, the device could annunciate the nature of the alarm and instruct occupants to follow a safe egress route.

Finally, the device may act as a WiFi and Bluetooth access point and push notifications to the personal mobile devices possessed by occupants within radio range of the device.

Logical Access Control

Figure 9:
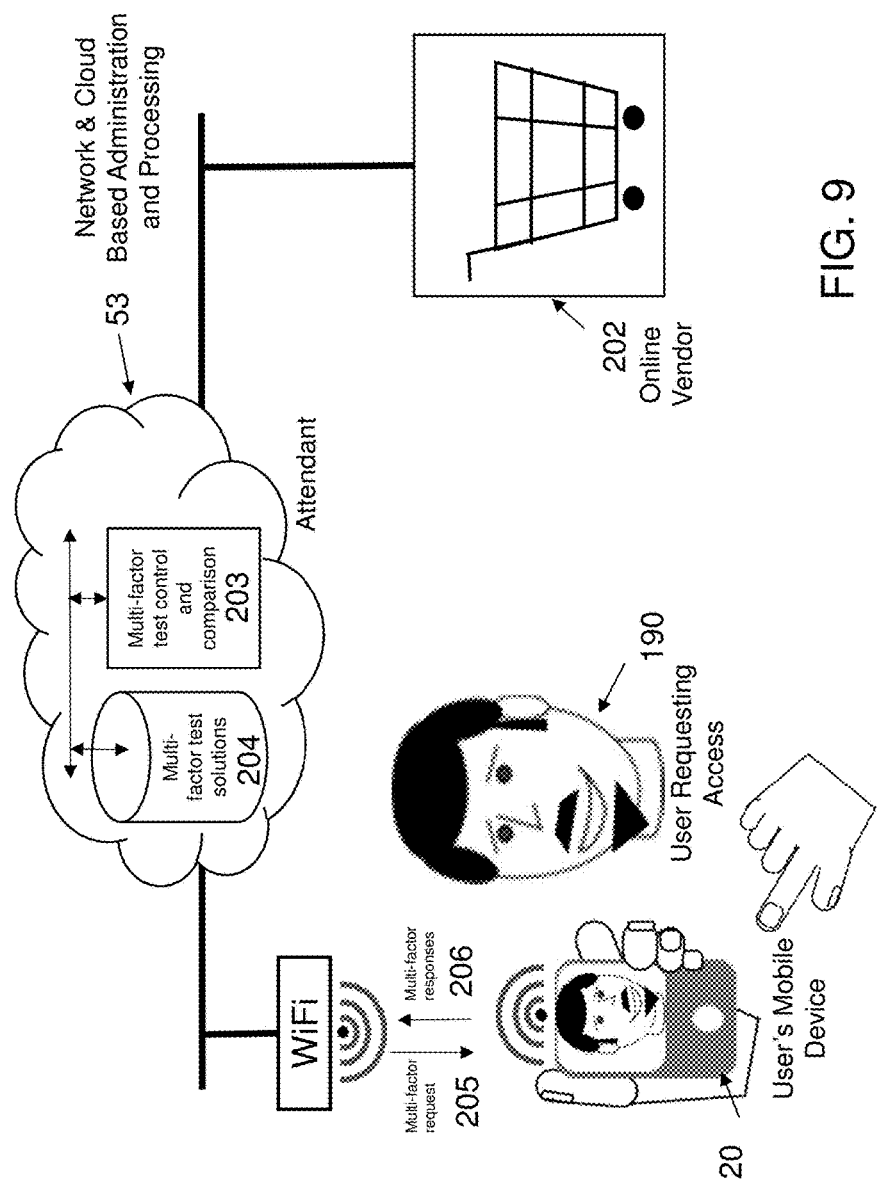
FIG. 9 is a view of an environment illustrating a logical access control and general purpose authentication mode, in accordance with some embodiments.

The device in accordance with some embodiments can fulfill the role of a logical access control reader in several ways. In this embodiment the device may control access to a local or remote computing device, or may serve to authenticate the user in support of a controlled process such as an online financial transaction. Referring to FIG. 9, in the logical access control embodiment the device 20 may be rigidly mounted, as in the physical access control embodiment, or may be a portable device that features the same essential components necessary to authenticate the user with the same multi-factor and multi-biometric tests as those described for physical access control. The device components therefore may include but are not limited to a touchpad display, keypad, speaker, microphone, camera, light source, processor, storage, battery, wireless communications etc. as previously described for the physical access device.

As has been previously described the device may subject the user to authentication through some combination of multi-factor or multi-biometric tests. If the prevailing authentication tests are satisfied, in one instance the device may output an electronic message, which may be encrypted, to a remote system 53 indicating the user has successfully authenticated himself in accordance with security protocols. For example, a user 190 may authenticate himself to a mobile access control device 20 in support of a point of sale (POS) transaction or alternatively an online transaction with an internet based vendor 202. In the latter case the online vendor may define and communicate the required authentication tests 205 to complete the transaction to the user's device. In response the user may submit to authentication resulting in the authentication test results 206, which may include biometric data, being communicated to a host, which may be the online vendor or may be a third party, where the results are compared 203 with stored authentication results 204 to ascertain if the tests are satisfied. If the authentication is verified as valid then the transaction is safe to conclude.

In another embodiment, the multi-factor tests are conducted and validated on the device. In this embodiment the device may communicate to the party requesting authentication that the tests were satisfied.

What is claimed is:

1. A multi-factor multi-biometric access control device, comprising:
    at least one hardware processor;
    a memory device coupled to the at least one hardware processor;
    a sensor in communication with the at least one hardware processor, and that collects multiple and dissimilar-biometric signal data from a user;
    a computer readable storage device coupled to the at least one hardware processor, wherein the storage device contains program code executable by the at least one hardware processor via the memory device, wherein the at least one hardware processor further:
    extracts from the multiple and dissimilar-biometric signal data at least two dissimilar biometric signals related to a combination of at least two or more of a voice, speech, appearance, size, color, behavior, and physiology of the user;
    fuses the dissimilar biometric signals to generate at least one characteristic vector;
    compares the generated at least one characteristic vector with at least one stored preexisting model of characteristic vectors to produce a biometric match result for authenticating the user;
    analyzes the dissimilar biometric signals to determine a biometric authentication by at least one of locally comparing the biometric signals to those stored on the device or passing biometric signals from the device to a remote host for a remote biometric signal comparison;
    in response to the biometric match result having a strength that is greater than a predetermined threshold, authenticates according to the biometric authentication; and
    in response to the biometric match result having a strength that is less than a predetermined threshold, authenticates the user and according to a multi-factor authentication that includes a combination of the biometric authentication and at least one other factor selected from a group consisting of a possession authentication, a knowledge authentication, and another form of authentication based on at least one of what the user knows, what the user possesses or what unique physical, biological and physiological traits the user has, the access control device further comprising:
    a display; and
    a network communication device that exchanges at least one of data, commands or configurations with a remote resource before, during or after authentication.

2. Device of claim 1 wherein the at least one hardware processor is further configured to authenticate the user by who the user is in response to at least one of a remote command and in response to analysis of one or more of the authentication solutions collected and as a result of analysis of other data originating within the access control device.

3. Device of claim 1, further comprising a light source that directs light at the user's face that originates with at least one of the display, a dedicated illumination source integral to the device, and a decoupled illumination source.

4. Device of claim 3, wherein an illumination projected by the light source on to the user may make use of at least one of directional and spectral and spatial and frequency control of light.

5. Device of claim 4, wherein the sensor further comprises a camera, wherein the light source works in cooperation with the camera to at least one of derive three dimensional data of the area proximal to the user and produce three dimensional data of the user's face for subsequent analysis.

6. Device of claim 3, wherein the illumination source employed is actuated by means of at least one of synchronized to at least one frame rate, and triggered by the sensor, and triggered in response to analysis of the user's face image data.

7. Device of claim 6 wherein the light source illuminates the user in a manner designed to at least one of induce a retro-reflection from the user's eye and induce a physical involuntary response to the projected illumination.

8. Device of claim 6, further comprising:
a message board that conveys information that includes at least one of health and safety alarm notification and feedback to assist a user through an access process; and
an access control reader to also serve as an alarm node for health and safety.

9. Device of claim 8, wherein the information includes a combination of messages, floor plans, time and weather.

10. Device of claim 8, wherein after authentication the message board conveys messages to the user, wherein a message is tailored to the user after the user's identity has been established.

11. Device of claim 8, further conveying messages on display prior to recognition, customized during recognition, and customized as a result of recognition.

12. Device of claim 1 wherein the device includes a video intercom permitting a user proximal to the device and another remote person to at least one of see and hear and exchange at least one of visual and audible information with each other.

13. Device of claim 1, wherein the device accepts enrollment data from a remote device that issues the user with at least one of a unique knowledge based passkey and a unique possession based pass key and user biometric data so that a user may be pre-authorized to use the device for at least one of authentication or video intercom to gain access through a controlled portal or area.

14. Device of claim 1 wherein the device continuously surveils the area proximal to the controlled area by at least one of collecting and analyzing and storing and transferring at least one of images and video and audio data and metadata.

15. Device of claim 1 wherein the device provides authentication for logical access control and other authentication purposes.

16. Device of claim 1, wherein the device produces an image of a face of the user who requests access by means of at least one of reconstructing biometric data to form a recognizable likeness of the user and capturing an image of the user.

17. Device of claim 1, wherein the device includes a physical access control controller, and following user authentication determines user authorization to pass on to a controlled area.

18. Device of claim 1 further comprising:
the multi-factor multi-biometric access control device gathering all available authentication information from all available instances of the device;
using the gathered information to build long-term, multi-device models of authenticated subjects;
using the models to detect and report events including at least one of:
changing of user appearance;
unauthorized access attempts; or
behavior and physiology of subjects; and
controlling other lighting, actuating, or sensor devices in communication with the multi-factor multi-biometric access control device.

19. A method of automated multi-biometric multi-factor (MBMF) identification from a single device, wherein at least two biometric signals of voice, appearance, size, color, behavioral, and physiological aspects are combined, the method further comprising:
collecting multiple and dissimilar-biometric signal data from a user;
extracting from the multiple and dissimilar-biometric signal data at least two dissimilar biometric signals related to a combination of at least two or more of a voice, speech, appearance, size, color, behavior, and physiology of the user;
fusing the dissimilar biometric signals to generate at least one characteristic vector;
comparing the generated at least one characteristic vector with at least one stored preexisting model of characteristic vectors to produce a biometric match result for authenticating the user;
analyzing the dissimilar biometric signals to determine a biometric authentication by at least one of locally comparing the biometric signals to those stored on the device or passing biometric signals from the device to a remote host for a remote biometric signal comparison;
in response to the biometric match result having a strength that is greater than a predetermined threshold, authenticating according to the biometric authentication; and
in response to the biometric match result having a strength that is less than a predetermined threshold, authenticating the user according to a multi-factor authentication that includes a combination of the biometric authentication and at least one other factor selected from a group consisting of a possession authentication, a knowledge authentication, and another form of authentication based on at least one of what the user knows, what the user possesses or what unique physical, biological and physiological traits the user has.

20. The method of claim 19, further comprising disseminating information about the authentication including, but not limited to, at least one of: a subject identifier; a subset of the multiple biometric data and derived characteristic vectors; a human recognizable likeness of said subject; a description of the date, time, location, duration, and/or strength of the authentication; and a mobile device carried by the subject.

21. The method of claim 19, further comprising collecting, analyzing and exploiting data collected from historical access attempts to maintain and improve technical performance.

* * * * *